O. S. GROPPER.
ILLUMINATED LICENSE PLATE.
APPLICATION FILED NOV. 8, 1918.
1,315,116.
Patented Sept. 2, 1919.
2 SHEETS—SHEET 1.
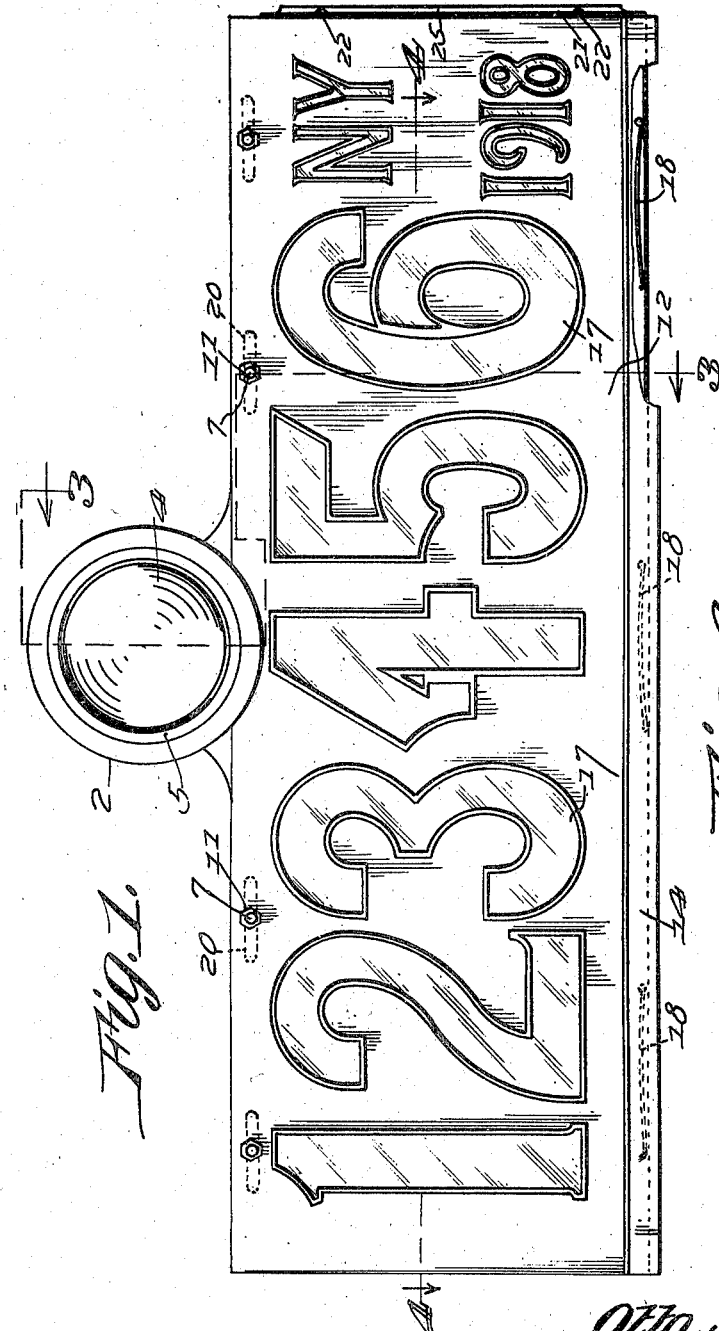
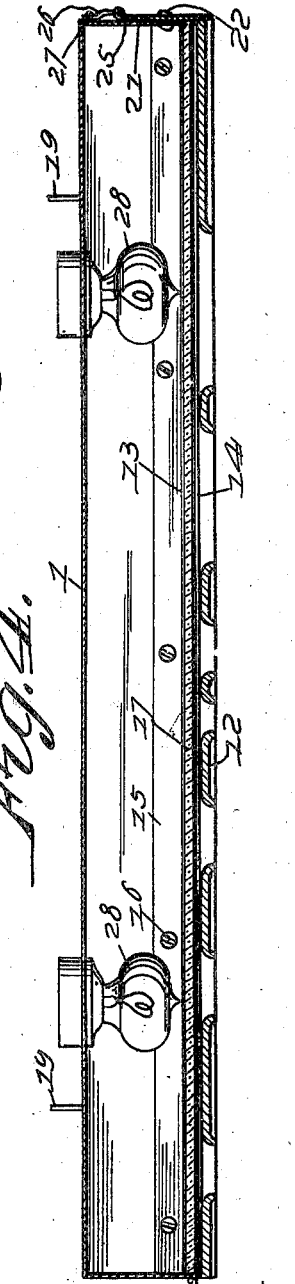
Inventor
Otto S. Gropper,
By
Attorney

O. S. GROPPER.
ILLUMINATED LICENSE PLATE.
APPLICATION FILED NOV. 8, 1918.

1,315,116.

Patented Sept. 2, 1919.
2 SHEETS—SHEET 2.

Inventor
Otto S. Gropper,
By
E. Hume Talbert,
Attorney

UNITED STATES PATENT OFFICE.

OTTO S. GROPPER, OF LONG ISLAND CITY, NEW YORK.

ILLUMINATED LICENSE-PLATE.

1,315,116.   Specification of Letters Patent.   Patented Sept. 2, 1919.

Application filed November 8, 1918. Serial No. 261,650.

*To all whom it may concern:*

Be it known that I, OTTO S. GROPPER, a citizen of the United States, residing at Long Island City, in the county of Queens and State of New York, have invented new and useful Improvements in Illuminated License-Plates, of which the following is a specification.

The invention seeks to provide, as its principal object, a license plate for auto vehicles and the like, wherein the license number will appear as clear at night as in the day.

A further object is to provide a metallic casing for attachment on the rear of a vehicle, the casing having interior suitable illuminants, the light from which is projected through an opalescent glass forming the front of the casing, and over which glass there is carried a license plate in which the license numbers are punched.

A still further object is to provide a casing, access to the interior of which is had only through the front, and that only after the removal of the license plate and the opalescent glass, a novel means being provided for retaining both the glass and the license plate in their normal positions on the front of the casing.

A still further object is the provision of a yieldable means to secure the glass from rattling.

Still further and other objects will appear as the invention is set forth in detail in the following description.

While illustrated and described in a specific embodiment, the invention is not to be restricted to such embodiment. The continued use in practice may suggest certain desirable changes or alterations and the right is claimed to make any which do not deviate from the scope of the annexed claim.

The several numerals of reference designate the same parts throughout the several figures of the drawings, wherein;

Figure 1 is a view in front elevation of the invention,

Fig. 4 is a section on the line 4—4 of Fig. 1.

Figure 3:
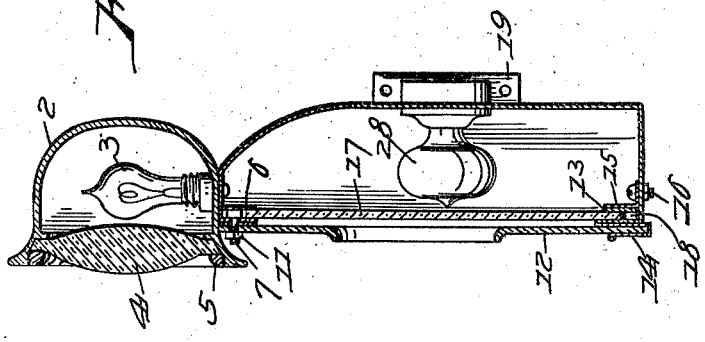
Fig. 3 is a section on the line 3—3 of Fig. 1.
Figure 2:
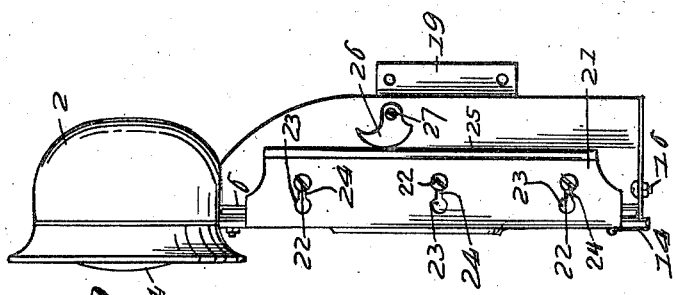
Fig. 2 is an end elevation.

Referring to the drawings, there is shown a metallic casing 1 which is rectangular in elevation, its elevational dimensions closely approximating those of the conventional license plate. The casing is closed at the top, bottom and back, the top at its longitudinal center having formed therewith a casing 2 in which the tail light 3 is carried, the casing 2 being provided with a suitable glass 4 which closes it on the front and a bezel 5 which holds the glass in place. The top of the casing carries a channel member 6 extending throughout the length of the casing, and positioned adjacent to the front edge of the top, the outer leg of the channel 6 carrying bolts 7 which pass through the outer leg and whose threaded ends project out beyond the front of the casing where they receive the ends 11, these for the purpose of holding the upper edge of the license plate 12 in position, as is later described.

The bottom of the casing adjacent the front edge is provided with a twin channel member comprising the channels 13 and 14, the two being formed from a single plate bent to the formation of substantially a double U in cross section, a flange 15 being formed with the channel 13 and at right angles to the inner leg of the latter. This flange 15 is provided so that bolts 16 may pass through it and the bottom of the casing to hold the double channel member secured to the said bottom. The channel 14 is so formed that the transverse portion of the U drops to a lower level than the transverse portion of the channel 13 which rests upon the bottom of the casing, 90 the inner leg of the channel 14 abutting the bottom on the edge. The double channel member, like the channel 6 extends for the full length of the casing and its channel 13 together with the channel 6 is designed to receive an opalescent glass 17 whose top and bottom edges are straddled by the channels 6 and 13 respectively, the channel 13 having attached to its web, or transverse portion, the flat bowed springs 18 on which the bottom edge of the glass rests so as to provide against damage of the glass due to vibration of the casing resulting from vibration of the vehicle or machine on which the casing is attached. The bowed springs 18 are secured in the channel 13 only at one end of the springs, so that the springs may be free to provide the resiliency for which they are intended.

Members 19 secured on the back of the casing are provided for the purpose of attaching the casing to the vehicle on which the invention is used.

The channel 14 is designed to receive the bottom longitudinal edge of the license plate 12, this bottom edge being inserted in the channel prior to its upper edge being engaged by the bolts 7, the license plate having the elongated holes 20 through which the bolts 7 may pass prior to the attachment of the nuts 11. The holes 20 are elongated to facilitate the attachment of the license plates to the bolts 7, the elongation of the holes compensating for any inequalities in the spacing of the bolts 11 on different casings.

The glass 17 is removable for the purpose of providing access to the interior of the casing and for this purpose one end wall of the casing is terminated short of the channels 6 and 13 so that the glass may be inserted in the channels at this side of the casing, one end of the glass abutting the other end of the casing. The remaining end of the glass, after the glass has been inserted in the channel is covered by a plate 21 which is carried by that end of the casing previously referred to as being terminated short of the channels. This end of the casing carries headed studs 22 and the plate 21 is provided with holes 23 of the same diameter as the heads of the studs 22, slots 24 being formed in the plate 21 and communicating with the holes 23, the slots being of a width equal to the diameter of the studs. When the holes 23 are in registration with the heads of the studs 22, the edge of the plate 21 leaves the end of the glass 17 exposed, and the latter may be withdrawn or inserted in the channels. When the plate is moved laterally, the studs pass into the slots 24, in which position of the plate, its edge covers the end of the glass 17, thereby precluding any movement longitudinally of the glass. The plate 21 is provided with a coiled edge 25 opposite that longitudinal edge which covers the end of the glass 17, this for the purpose of permitting easy handling of the plate in effecting its engagement or disengagement with the studs 22.

To secure the plate 21 in the position where it retains the glass in position, there is provided a cam member 26 pivotally mounted on the stud 27 fixed in the end of the casing 1. This cam 26 may be moved into either of two positions, one where it retains the studs 22 in engagement with the slots 24, and the other where it permits the plate to be drawn backward to bring the holes 23 in registration with the heads of the studs 22, this latter position permitting the removal of the plate 21 if desired, and also permitting the removal of the glass 17.

Carried within the casing 1 and positioned one on either side of the longitudinal center of the casing, there is an illuminating member 28 whose rays shine through the glass 17, and show through the numbers on the license plate 12, thereby making the said numbers discernible at night and at a very great distance from the vehicle.

From the foregoing description taken in conjunction with the accompanying drawings, the construction and operation of the invention is readily apparent, and further description is, therefore omitted.

The invention having been described, what is claimed as new and useful is:

A license plate device comprising a casing open on its front side, channel members attached to the bottom and top of said casing and extending throughout the length thereof, a flat transparent element whose upper and lower edges are straddled by the channel members, one end of the casing being terminated short of the channel members so that the said element may be withdrawn and replaced, a plate, headed studs attached to that end of the casing which is terminated short of the channel members, the plate being formed with holes through which the heads of said studs may pass and being further formed with slots which the shanks of said studs may enter, the slots communicating with the said holes and being disposed at an angle with the back of the casing, and a pivotally mounted cam member carried by the casing and engageable with said plate, whereby the plate may be made to overlap the ends of the channel members to retain the said element therein or withdrawn toward the back of the casing to permit the removal of said element.

In testimony whereof I affix my signature.

OTTO S. GROPPER.